United States Patent [19]

Seymus

[11] 4,031,286

[45] * June 21, 1977

[54] FLUOROCARBON POLYMER COATING COMPOSITIONS CONTAINING MICA PARTICLES

[75] Inventor: Herman Ernest Seymus, Lint, Belgium

[73] Assignee: E. I. Du Pont de Nemours and Company, Wilmington, Del.

[ * ] Notice: The portion of the term of this patent subsequent to July 20, 1993, has been disclaimed.

[22] Filed: Feb. 25, 1976

[21] Appl. No.: 661,331

Related U.S. Application Data

[63] Continuation-in-part of Ser. No. 400,040, Sept. 24, 1973, Pat. No. 3,970,627.

[52] U.S. Cl. .................... 428/324; 260/29.6 F; 428/328; 428/331; 428/432; 428/454; 428/463; 428/469

[51] Int. Cl.² .................... B32B 5/16; C08L 27/18; B32B 15/08

[58] Field of Search .......... 428/324, 422, 331, 328, 428/428, 432, 454, 463, 471, 469; 260/29.6 F

[56] References Cited

UNITED STATES PATENTS

| | | | |
|---|---|---|---|
| 2,710,266 | 6/1955 | Hochberg | 428/422 |
| 2,825,664 | 5/1956 | Huntsberger | 260/29.6 F |
| 2,961,341 | 11/1960 | Long | 260/29.6 F |
| 2,979,418 | 4/1961 | Dipner | 260/29.6 F |
| 3,655,604 | 4/1972 | Strolle | 260/29.6 F |
| 3,694,392 | 9/1972 | Werner | 260/29.6 F |
| 3,970,627 | 7/1976 | Seymus | 428/422 |

*Primary Examiner*—Ellis Robinson

[57] ABSTRACT

Aqueous fluorocarbon polymer coating compositions which contain colloidal silica and mica particles are provided. These compositions are useful for coating substrates, especially metallic cookware and bakeware to give non-stick finishes having improved resistance degradation by hot oil.

7 Claims, No Drawings

FLUOROCARBON POLYMER COATING COMPOSITIONS CONTAINING MICA PARTICLES

BACKGROUND OF THE INVENTION

1. Field of the Invention

This invention relates to aqueous fluorocarbon polymer coating compositions and articles coated therewith and more particularly to such compositions and metallic articles coated therewith having improved resistance to degradation by hot oil.

2. Prior Art

In recent years, the use of fluorocarbon polymer coatings as non-stick finishes for metal substrates, particularly for cookware, has become widespread. The physical nature of fluorocarbon polymers make it difficult to bond them to metallic substrates sufficiently well to prevent coatings of the polymers from blistering and peeling during use. This is especially true of polytetrafluoroethylene.

Adhesion of such coatings has been improved by the addition of a water-soluble alkali metal silicate or a colloidal silica to the fluorocarbon polymer coating composition, as described in U.S. Pat. No. 2,825,664, issued Mar. 4, 1958 to James R. Huntsberger. In U.S. patent application Ser. No. 405,798 filed Oct. 12, 1973, adhesion of such coatings was improved by adding colloidal silica stabilized with sodium ions to the fluorocarbon polymer coating composition.

While the compositions described in the aforesaid references do improve adhesion to unprimed metal substrates, there are some end-use applications where resistance to degradation by hot oil is desirable. In cookware, for example, resistance to degradation by hot oil, especially at about 200° C, is desirable in such articles as frypans, meat grills and sauce pans, where fats and oils are in contact with the fluorocarbon polymer coating during the cooking process.

SUMMARY OF THE INVENTION

According to the present invention there is provided an aqueous coating composition comprising:
a. about 40–93%, by weight of the total of (a), (b) and (c) solids, of a fluorocarbon polymer,
b. about 5–35%, by weight of the total of (a), (b) and (c) solids, of colloidal silica stabilized with sodium ions, or a mixture of said silica with a water-soluble alkali metal silicate,
c. about 2–25%, by weight of the total of (a), (b) and (c) solids, of mica particles, and
d. water as a carrier.

There is also provided an article comprising a substrate coated with a fused coating of the above-described coating composition. These fused coatings have improved resistance to degradation by hot oil.

DETAILED DESCRIPTION OF THE INVENTION

The fluorocarbon polymers used in the compositions are of hydrocarbon monomers completely substituted with fluorine atoms. Illustrative of such polymers ae polytetrafluoroethylene (PTFE), copolymers of tetrafluoroethylene and hexafluoropropylene in all monomer unit ratios, and fluorochlorocarbon polymers such as polymonochlorotrifluoroethylene. Mixtures of these can be used. PTFE is preferred.

The fluorocarbon polymer used is particulate. The particles are preferably small enough to pass through the nozzle of a spray gun without clogging it and small enough to give the resulting film coalescence and integrity. In ordinary situations, the particles are preferably no larger than about 0.35 micron (average) in the longest dimension.

Although one can use a dry flour or powder of fluorocarbon polymer and provide a liquid carrier separately, it is preferred to use the polymer in the form of an aqueous dispersion because it is most easily obtained on the market in that form. A dispersion of fluorocarbon polymer in an organic liquid miscible with water, such as ethanol, isopropanol, acetone or a Cellosolve, can also be used. In any case, the liquid also serves as a portion of the carrier for the composition.

The fluorocarbon polymer is present in the composition at a concentration of from about 40% through about 93%, by weight of the total of fluorocarbon polymer, mica and colloidal silica solids. A concentration of 50–90% is preferred; 70–90% is even more preferred.

The colloidal silica used in the composition is generally in the form of an aqueous sol. This silica is stabilized with sodium ions, has a particle size of 7–25 millimicrons, a specific surface area of 125–420 square meters per gram, a silica content (calculated at $SiO_2$) of 30–50% by weight, and a pH of 8.4–9.9 at 25° C. Typical of such a colloidal silica are those sold by E. I. duPont de Nemours and Company as "Ludox HS-40", "Ludox-HS", "Ludox LS", "Ludox SM-30", "Ludox TM", and "Ludox AM". Mixtures of silicas can be used. "Ludox AM" is preferred. This product is a sodium stabilized colloidal silica whose particles are surface-modified with aluminum, having a particle size of 13–14 millimicrons, a specific surface area of 210–230 square meters per gram, a silica content (calculated as $SiO_2$) of 30.0% and a pH at 25° C of 9.0.

The colloidal silica is present in the composition at a concentration of from aout 5 through 35%, preferably 10–20%, by weight of the total of fluorocarbon polymer, mica and silica solids. Instead of colloidal silica, a mixture of colloidal silica and a water-soluble alkali metal silicate can be used, as described in U.S. Pat. No. 2,825,664, the disclosure of which is hereby incorporated by reference.

As described in U.S. Pat. No. 2,825,664, any aqueous solution of an alkali metal silicate or mixtures thereof may be used in the compositions of this invention. Such silicate solutions are available commercially in a wide range of $SiO_2$ alkali metal oxide molar ratios, e.g., from about 1:1 to 4:1. Certain water-soluble alkali metal silicates having an $SiO_2$ molar proportion above 4 can be prepared and may also be used. Examples of suitable water-soluble alkali metal silicates are potassium silicate, sodium silicate and lithium polysilicate. The ratio of alkali metal silicate to colloidal silica is usually in the range between 25:75 and 90:10 by weight, preferably between 50:50 and 80:20 by weight.

The mica used in the compositions of this invention is of the wet ground variety and is provided in the form of irregularly shaped platelets, 80% by weight of which are about 0.05–0.15 micron thick and about 4–50 microns wide in the longest dimension. Such micas are available commercially. The mica is generally present in a composition of the invention at a concentration of about 2–25%, by weight, of the total of fluorocarbon polymer, mica and silica solids, preferably 5–15% by weight. Mixtures of two or more types of mica having different particle size ranges can also be used.

The composition itself is made by simply mixing proper amounts of a suitable colloidal silica sol., with or without an alkali metal silicate, mica or coated mica and a suitable fluorocarbon polymer dispersion. A minimum of shear should be used in preparing the composition so that the shapes and sizes of the mica particles are not altered significantly. The composition can be pigmented, if this is desired, by first preparing a suitable pigment dispersion according to any conventional technique and then adding this pigment dispersion to the silica sol-mica fluoropolymer mixture.

Adjuncts such as flow agents, coalescing aids, anti-cratering agents, anti-mudcracking agents and the like can also be added if this appears necessary.

The resulting composition can be applied by spraying, brushing, roller-coating, dipping or the like. If the substrate is metal, this is preferably pre-treated by grit-blasting, by the flame spraying of a metal or a metal oxide, or by frit coating, although the composition can be applied successfully to phosphated and chromated non-grit blasted metals. If the substrate is glass, it is preferably first gritblasted or frit coated.

The composition is ordinarily applied to a thickness of 5–65 microns (dry). After application, the composition is air-dried and the article baked for a time and at a temperature sufficient to fuse the fluoropolymer used.

The composition is most useful for coating cookware, especially bakeware, frying pans, and for coating meat grills, but it can also be used to coat any article capable of withstanding the baking temperature used. For example, the composition can be used to coat bearings, valves, wire, metal foil, boilers, pipes, ship bottoms, oven liners, iron soleplates, waffle irons, ice cube trays, snow shovels and plows, chutes, conveyors, dies, tools such as saws, files and drills, hoppers, and industrial containers and molds. It can also be used to coat plastic articles.

The invention can be further understood by the following example, in which all parts and percentages are by weight unless otherwise indicated.

A coating composition was prepared by mixing the following ingredients:

| | Parts |
|---|---|
| Aqueous polytetrafluoroethylene dispersion[1] | 67.4 |
| Sodium lauryl alcohol sulfate dispersing agent (30% in water) | 3.5 |
| Mica (wet ground) particle size distribution between 5 and 30 mircons | 5.1 |
| Carbon black/aluminum silicate dispersion (30% in water, 20% carbon black and 10% aluminium silicate) | 5.0 |
| Colloidal silica stabilized with sodium[2] | 19.0 |
| | 100.0 |

[1] The dispersion contained 60% colloidal polytetrafluoroethylene and 3.5% octylphenyl polyglycol ether.
[2] The aqueous colloidal silica contained 30% silica stabilized with sodium, had a $SiO_2/Na_2O$ ratio of 230, a particle size of 13–14 millimicrons and the silica particles surface-modified with aluminate ions. The PTFE to $SiO_2$ ratio in this example is: 100/14.

One coat of this composition was sprayed, to a thickness of 15 microns, on an aluminum panel which had been pre-treated by grit-blasting to a profile of 10 to 15 microns. The panel was then baked at 400° C for 10 minutes.

The panel was then boiled in vegetable oil for 3 hours.

Adhesion of the coating to the substrate was determined as follows:

1. The coating was scratched with a knife down to the metal surface to give a grid of 10 × 10 squares with the lines 2 mm. apart.
2. An adhesive tape was applied over the grid and then pulled off.
3. The number of squares remaining was then determined on a percentage basis. The minimum acceptable level is 70%.

As a control, a duplicate panel was similarly coated with the same composition lacking the mica component.

The results were as follows:
Control panel; 60% adhesion
Example panel; 80% adhesion.

What is claimed is:

1. An aqueous coating composition consisting essentially of:
   a. about 40–93%, by weight of the total of (a), (b) and (c) solids, of a particulate fluorocarbon polymer,
   b. about 5–35%, by weight of the total of (a), (b) and (c) solids, of colloidal silica stabilized with sodium ions, having a particle size of 7–25 millimicrons, a specific surface area of 125–420 square meters per gram, a silica content of 30–50% by weight, and a pH of 8.4–9.9 at 25° C., or a mixture of said silica with water-soluble alkali metal silicate, in a ratio in the range between 75:25 and 10:90 by weight respectively,
   c. about 2–25%, by weight of the total of (a), (b) and (c) solids, of irregularly shaped mica platelets 80% of which are 0.05–0.15 micron thick and 4–50 microns wide (longest dimension) and
   d. water as a carrier.

2. The composition of claim 1 wherein the fluorocarbon polymer in (a) is polytetrafluoroethylene.

3. The composition of claim 1 wherein the solids of (a), (b) and (c) comprise about 50–90% by weight (a), about 10–20% by weight (b) and about 5–15% by weight (c).

4. The composition of claim 1 wherein the polymer in (a) is PTFE and the colloidal silica in (b) is one whose particles are surface-modified with aluminum, having a particle size of 13–14 millicrons, a specific surface area of 210–230 square meters per gram, a silica content of 30% and a pH at 25° C of 9.0.

5. An article bearing a fused coating of the composition of claim 1.

6. An article bearing a fused coating of the composition of claim 2.

7. An article bearing a fused coating of the composition of claim 3.

* * * * *